Figure 1:
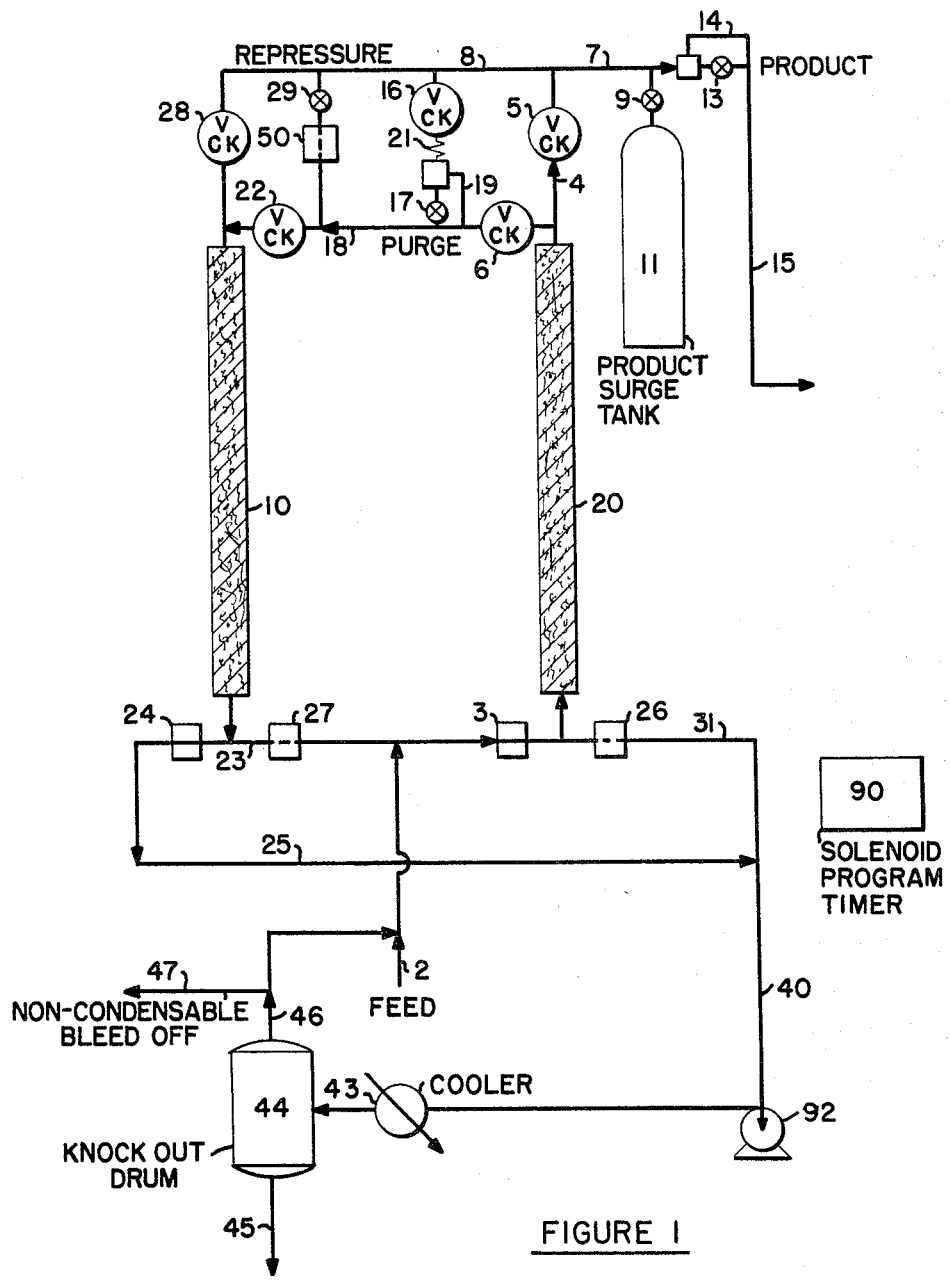
Figure 2:
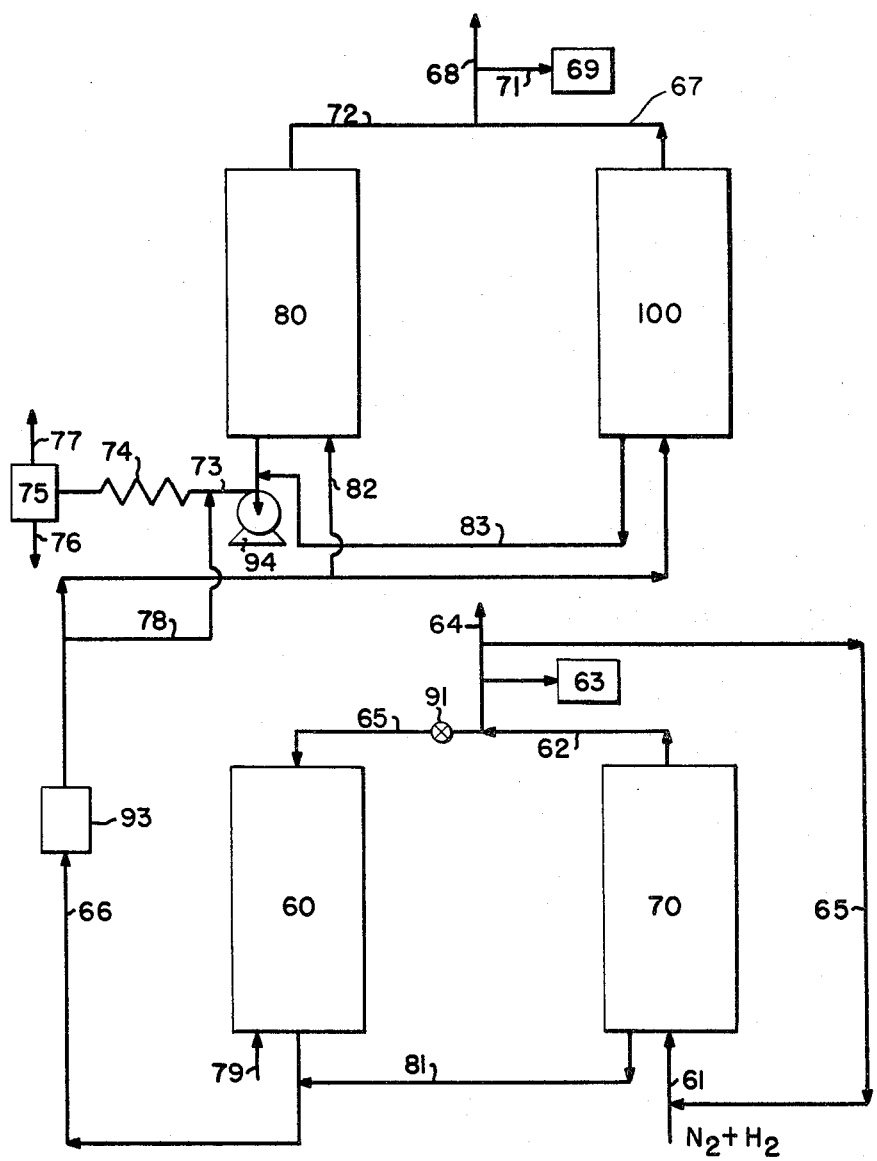

Charles W. Skarstrom
Richard P. Crowley     Inventors
William O. Heilman

By W. O. J Heilman

Patent Attorney

United States Patent Office 3,282,647
Patented Nov. 1, 1966

---

3,282,647
PRESSURE CYCLING OPERATION FOR THE
MANUFACTURE OF AMMONIA
Charles W. Skarstrom, Montvale, N.J., Richard P. Crowley, Milton, Mass., and William O. Heilman, Short Hills, N.J., assignors to Esso Research and Engineering Company, a corporation of Delaware
Filed Feb. 5, 1964, Ser. No. 344,802
9 Claims. (Cl. 23—199)

The present invention is a continuation-in-part of Serial No. 231,871, filed October 19, 1962, now abandoned, which in turn is a continuation-in-part of Serial No. 56,434, filed September 16, 1960, entitled "Pressure Cycling Operation for the Manufacture of Ammonia"; inventors: Charles W. Skarstrom, Richard P. Crowley and William O. Heilman. This latter application, in turn, was an extension and an improvement of the process and apparatus described in U.S. Patent 2,944,627 issued July 12, 1960, entitled "Method and Apparatus for Fractionating Gaseous Mixtures by Adsorption," inventor: Charles W. Skarstrom.

The present invention is especially concerned with an improved method and an improved apparatus for the fixation of atmospheric nitrogen. The present invention utilizes the pressure cycling technique of the above-identified patent, in order to effectively remove the reaction product from the catalytic or fixation zone and to also utilize, in conjunction with the catalytic zone, zones for the separation of the reaction product from the reactants. The invention is particularly concerned with an improvement in the manufacture of ammonia. In accordance with the present invention, higher yields of product and faster rates of reaction are secured. In addition, the present technique permits the carrying out of the ammonia synthesis at lower temperatures and pressures, which synthesis normally requires relatively high pressures and temperatures.

However, the invention generally relates to a method and apparatus for removing one or more reaction components from a gaseous reacting mixture or gas stream containing such components. Thus, in general, the present process is concerned with an operation employing a delta pressure cycle wherein the reaction product formed is removed by adsorption in the reaction zone. As pointed out heretofore, the present invention is particularly adapted to a delta pressure cycle reaction which has equilibrium limitations and in which the catalyst and adsorbent are present in the reaction zone. The invention further relates to such a method and apparatus employed for the separation of a gaseous mixture of one or more reaction components. The invention further relates to a method and apparatus employed for the purpose of producing an effluent product wherein by removal of one or more components of the original mixture, the percentage concentration of more desirable components is increased in the resulting product. As pointed out heretofore, the invention is particularly concerned with the fixation of atmospheric nitrogen in order to produce ammonia in a more efficient and effective manner and to also separate the ammonia from reactant gases as, for example, hydrogen and nitrogen.

It is well known in the art to employ various processes to fix nitrogen for the production of ammonia. In these processes, nitrogen and hydrogen are mixed in the proper amounts and brought in contact with a substance such as specially prepared porous iron granules at elevated temperatures and under high pressures wherein the following reaction occurs:

$$N_2 + 3H_2 \rightarrow 2NH_3 + 24 \text{ kilo calories}$$

This reaction must be initiated at a relatively high temperature, but which cannot go too high since it tends to decompose the ammonia. On the other hand, relatively high pressures tend to help the formation of the ammonia in accordance with the principle of Le Chatelier. Known processes, for example, are of the so-called "American System" wherein the reaction chamber is at a pressure about 300 atmospheres and wherein the temperature is about 475° C. The catalyst comprises iron oxide granules containing the combined promoters potassium and aluminum oxides; the proportions are approximately 1% potassium oxide and 3% aluminum oxide, based upon the weight of the iron oxide. The catalyst is prepared by burning pure iron in oxygen which is then fused in an electric furnace. The iron oxide is crushed and then mixed with the desired promoters. In this process, care is exercised to prevent the temperature rising to 500° C. since this temperature rise greatly shortens the life of the catalyst.

In the Haber process, the pressure is about 200 atmospheres and the temperature about 550° C. The catalyst in this process is promoted iron, as for example iron oxide containing small amounts of chromium and cerium. In all cases, the feed gases should comprise substantially pure nitrogen and hydrogen present in the proper proportions and free of carbon dioxide and other contaminants. The Mont Cenis process is similar to the Haber process except that the catalyst comprises an iron cyanide complex. In this process, a relatively low pressure of 100 atmospheres is utilized and the temperature is approximately 400° C. The ammonia is obtained in the liquid form at once. In the Claude process, the pressure is about 900 atmospheres and the temperature is in the range from about 500° C. to 650° C. The catalyst comprises promoted iron granules. The Casele process utilizes a pressure of about 750 atmospheres and the temperature is approximately 475° C. Here again the catalyst comprises promoted iron granules.

In the foregoing processes described, the conversion is relatively low, generally in the range below 40% and as low as 8%. Thus, any improvement in the technique which increases the conversion will result in material benefits. In accordance with the present process, conversions can be increased by effectively removing the reaction product ammonia quickly from the system as it is formed. This result is obtained by the technique and apparatus of the present invention.

The present invention may be more fully understood by reference to the attached drawings illustrating embodiments of the same. FIGURE I illustrates an operation wherein the synthesis catalyst is packed into both adsorbent beds, whereas FIGURE II illustrates a combination technique wherein one set of dual beds contains catalysts and an adsorbent for the ammonia and wherein the second set of zones is packed with an adsorbent only. Generally, the operation comprises a cyclic operation wherein the reactants are introduced into high pressure zones and wherein the reaction products are removed from the low pressure zone. In essence, the operation comprises the utilization of two packed beds which are alternatively raised to a relatively high pressure and then reduced to a relatively low pressure, as described in the above-identified U.S. patent.

Referring specifically to FIGURE I, numerals 10 and 20 designate one of a pair of reaction vessels. For simplicity, these vessels are shown in a diagrammatical form, but it is to be understood that these packed vessels may comprise conventional reaction vessels for the production of ammonia such as described in "Industrial Chemistry" by Riegel, 3d edition, published by Reinhold Publishing Corporation, 330 West 44th Street, New York, 1937, page 118. Beds 10 and 20 may also comprise other types of converters now used in the art. Each vessel is adapted to contain and to be substantially fully packed with catalyst material, such as promoted iron granules or other catalysts satisfactory for the production of ammonia from nitrogen and hydrogen. The feed gas comprising nitrogen and hydrogen in the correct proportion is introduced into zone 20 by means of line 2. This feed gas passes through an open solenoid operated valve 3 and is introduced into the bottom of zone 20. Both zones 10 and 20 are packed with catalyst as, for example, promoted iron granules. Gases are removed from the top of zone 20 by means of line 4. The temperature in zone 20 is in the range from about 400 to 600° C. or lower, while the pressure is about 100 to 900 atmospheres. These gases flow through check valve 5 and cannot pass through valve 6. The gas then is divided into two streams. A portion of the gas passes through line 8 while the remainder passes through line 7. The portion of the dry gas passing through line 7 passes through valve 9 and is introduced into a product surge tank 11. The remainder of the gas in line 7 passes through valve 13, the rate of which is adjusted by a flow controller 14 which maintains predetermined pressure differential across the valve. Product gas is withdrawn by means of line 15.

That portion of the gas removed by means of line 8 is passed through check valve 16 through valve 17 and then into the top of zone 10 by means of valve 22 and line 18. The rate of flow through valve 17 is maintained at the desired rate of flow controller 19 which maintains the desired pressure drop across valve 17. In addition, valve 16 is spring loaded by means of spring 21 so as to only open after predetermined pressure drop occurs across valve 16.

The gas removed through line 18 passes through check valve 22 and into the top of zone 10 where it backwashes downwardly through the bed. Bed 10 is maintained at a predetermined pressure below the pressure existing in adsorption zone 20. The gas together with desorbed constituents is removed from the bottom of zone 10 through line 23. This stream passes through solenoid operated valve 24 through line 25 and is further processed as hereinafter described. Thus, when zone 20 is on reaction and zone 10 on backwash valves 3, 5, 9, 13, 16, 17, 22, and 24 are open, whereas valves 26, 27, 6, 28, and 29 are closed. At the end of the cycle when valve 24 closes, valve 29 opens until zone 10 reaches the predetermined high pressure. At this point valve 27 opens and valve 3 closes.

The cycle is then continued as hereinbefore described wherein zone 10 is on reaction and zone 20 is on backwash. A portion of the product gas flowing through valve 28 is used to backwash zone 20, a portion is used to repressure surge tank 11, and the remainder is passed through line 15 as product gas. The gas and desorbed components from zone 20 are passed through open valve 26, through line 31, and are handled as hereinafter described.

In essence, the apparatus described in FIGURE I comprises two catalyst beds which are alternately connected to the high pressure feed. While one bed is at a relatively high pressure, the other bed is reduced to a relatively low pressure, backwashed with some of the product through a flow control valve and brought back up to reaction pressure with product gas at the product end. It is to be understood that the bed also may be brought up to reaction pressure with feed gas at the feed end. These valves may comprise five 2-way electric solenoid valves. These on-off valves are operated and programmed from a multicam recycling electric timer 90 (wiring not shown). The use of two on-off feed and two on-off dump valves allows the low pressure bed to be repressured before the other bed is dumped. This insures continuity in the product pressure and flow.

That portion of the gas backwashed and the desorbed constituents are passed through line 40 and compressed to the desired pressure by means of compressor 92. It is to be understood that other known means for the separation of ammonia from hydrogen and nitrogen may be utilized, such as a condenser or by passing the gases through water which absorbs the ammonia. These gases are cooled in cooler 43 in order to condense out the ammonia. The stream is passed to a knockout or equivalent zone 44 wherein the ammonia is removed by means of line 45. The gases free of ammonia are removed overhead from zone 44 by means of line 46 and are preferably reheated and recombined with the feed. Under certain conditions, it may be desirable to bleed off a portion of these gases by means of line 47. As mentioned heretofore, zones 20 and 10 may comprise conventional types of reactors for the production of ammonia. Thus, zones 20 and 10 may contain tubes through which the feed gas is passed so as to secure heat transfer and thus raise these gases to threshold reaction temperatures. Since heat is evolved in the reaction, these zones may also contain cooling means so as to maintain them at the desired reaction temperatures. By operating in the manner described, the catalytic activity of the catlyst is enhanced. This may be due to the fact that the ammonia as formed tends to coat or form a film about the catalyst. Thus, any equilibrium mixture of product and reactants on the catalytic surface is continually disrupted in order to expose points of activity on the catalytic surface to the reactants.

While FIGURE I has been described generally with respect to pressures and pressure cycling, it is to be understood that in the particular operation for the manufacture of ammonia, the relatively high pressure may be as high as 1000 atmospheres or higher. Under these condtiions, while it is conceivable that the pressures may be substantially reduced, it is preferred to have the low pressure zone also at a relatively high pressure but below that existing in the high pressure zone. Thus, for example, the high pressure zone may operate at 1000 atmospheres and the low pressure zone at 800–900 atmospheres. Under certain circumstances, however, the ratio between the relatively high pressure and the relatively low pressure may be 2:1 or even as high as 4:1.

On the other hand, if a relatively low pressure operation was conducted, such as the Mont Cenis, then the high pressure zone would operate at about 100 atmospheres and the low pressure zone would operate at a somewhat lower pressure as for example in the range from 60–90 atmospheres.

Referring specifically to FIGURE II, which illustrates a preferred adaptation of the present invention, zones 60 and 70 represent fixation or reaction zones which are similar to those as described in FIGURE I and are similarly operated. For simplicity, only one-half of the cycle is described, it being understood that the zones are pressure cycled in a manner as hereinbefore described.

In operation zones 60 and 70 are packed with a fixation catalyst which may comprise promoted iron granules. These zones are also packed with an adsorbent having a preferential selectivity for ammonia as compared to nitrogen and hydrogen as, for example, activated carbon. These zones are pressure cycled and are at temperature and pressure conditions adapted to secure the formation of ammonia. The relatively high pressure may be about 300 atmospheres and the relatively low pressure about 200 atmospheres. The temperature is about 475° C. Thus, in operation, a feed mixture comprising nitrogen plus hydrogen is introduced into the relatively high pressure zone 70 by means of line 61. As these gases flow upwardly through zone 70, the nitrogen and hydrogen react in the presence of the catalyst to form ammonia, which ammonia is adsorbed on the adsorbent. Thus, an increasing concentration gradient of ammonia advances upwardly through tower 70. By the removal of the ammonia as formed from the system undergoing reaction, a mass effect is secured which further acelerates the formation of additional ammonia from the nitrogen and the hydrogen. Unreacted nitrogen and hydrogen are removed overhead from zone 70 by means of line 62. A portion of these gases may be passed to a surge tank 63 or removed by means of line 64. The gases removed by means of line 64 may be recycled to the feed by means of line 65. A portion or the entire amount of the gases removed by means of line 62 are passed through pressure reducing means 91 and are introduced into the top of zone 60 by means of line 65. Thus, when zone 70 goes on reaction, zone 60 is backwashed at the relative low pressure with a portion of all of the gases removed overhead from zone 70. This backwashing at a relatively low pressure serves to remove the adsorbed ammonia from the adsorbent, thus a decreasing concentration gradient of ammonia moves downwardly in zone 60. The backwashing gases plus the desorbed ammonia is removed from the bottom of zone 60 by means of line 66. It is evident that the concentration of the ammonia in the backwashing gases is relatively high as compared to the concentration of the ammonia in the effluent gases from a conventional reactor. This stream is passed through a cooling zone 93 wherein the temperature is reduced to a point above that at which the ammonia liquifies. As an adaptation of the present invention, stream 66 may comprise stream 15 or stream 40 of FIGURE I. This stream is then introduced into the bottom of separation or adsorption zone 100 which is also packed with a selective adsorbent for the ammonia which may comprise activated carbon. Zone 100 is operated preferably at a pressure below that of zone 60, but at a relatively high pressure as compared to zone 80 which is being desorbed simultaneously at a relatively low pressure. Thus, the pressure in zone 100 may be about 150 atmospheres and that of zone 80 about 100 atmospheres. The temperature maintained in zones 80 and 100 are sufficiently high so as to prevent the ammonia from liquefying. The gases flowing upwardly through zone 100 serve to produce an increasing concentration gradient of ammonia on the adsorbent. Gases comprising nitrogen and hydrogen are removed overhead from zone 100 by means of line 67 and divided into several streams. A portion of these gases are removed by means of line 68 from which a portion of these latter gases may be introduced in surge tank 69 by means of line 71. A further portion of these gases are introduced into the top of zone 80 operating at the relatively low pressure in order to backflow downwardly through zone 80. This serves to produce a decreasing concentration gradient of the ammonia on the adsorbent as the cycle progresses simultaneously with the adsorption cycle in the high pressure zone 100. Backwashing gases along with desorbed ammonia is removed from the bottom of zone 80 by means of line 73, passed through a cooling zone 74, and introduced into a separation zone 75. Liquefied ammonia is removed from the bottom of zone 75 by means of line 76 and uncondensed gases are removed overhead from separation zone 75 by means of line 77. Gases from lines 68 and 77 may be recycled to the feed which is introduced either into the bottom of zone 60 or zone 70.

While it is desirable to effect separation utilizing at least four zones, half of which are in series, under certain circumstances the gases removed from the bottom of zone 60 may be introduced directly into line 73 by means of line 78 and thus effect a separation merely by cooling.

Prior to the time when the catalyst in zone 70 loses activity, the cycle is reversed with respect to zones 60 and 70. The time of the cycle will vary appreciably and will depend upon the particular catalyst being used as well as the pressures and temperatures utilized. However, in general, it is preferred that the time of the cycle be below 10 minutes and preferably in the range of from about one-half to four minutes. By operating in this manner, the catalyst activity is enhanced. Also prior to the time when zone 100 becomes saturated with ammonia and zone 80 becomes completely free of ammonia, the cycle is reversed with respect to zone 80 and zone 100. Zone 80 will go into the high pressure adsorption cycle while zone 100 will go into the relatively low pressure desorption cycle.

Under these conditions, the feed is introduced into the bottom of zone 60 by means of line 79; the unreacted gases are removed overhead by means of line 65, a portion of which is introduced into the top of reaction zone 70. These gases plus desorbed ammonia are removed from the bottom of zone 70 by means of line 81 and introduced into the bottom of zone 80 by means of line 82. All unadsorbed gases are removed from the top of zone 80 by means of line 72, backflowed through the top of zone 100 in order to remove adsorbed constituents and then introduced into cooling zone 74 by means of line 83. It is to be understood that zones 60 and 70, as well as zones 80 and 100, may be operated in a manner similar to that described with respect to zones 10 and 20 of FIGURE I.

It is to be understood that proper valves, pumps, compressors, and the necessary manifolding of lines are used so as to operate the process as described.

With respect to the operation as described in FIGURE I, it is well known in the art that the yields of ammonia per pass are relatively low. By back cycling, with respect to FIGURE I, utilizing a cyclic pressure operation, the effectiveness of the catalyst is enhanced in order to secure improved yields. Also, the feed gases can be heat exchanged by passing them through tubes in the catalyst zone so as to effect heat economies.

With respect to the operation as described in FIGURE II wherein an adsorbent is used in conjunction with the catalyst, as pointed out heretofore, this tends to shift the equilibrium by the rapid and efficient removal of product ammonia so as to secure improved yields.

As pointed out above, the present invention is concerned with a method of reacting nitrogen with hydrogen to secure improved yields. In the process described, particularly with respect to FIGURE II, the product is removed by the adsorbent which is selective for the ammonia. The gas stream is flowed through the bed for a first cycle perioid less than that required for the bed to come to equilibrium with the ammonia fraction. A primary effluent comprising an unreacted portion of the feed stream is discharged from the bed at the end of the first cycle period, the flow of the feed stream is interrupted and the initial pressure on the bed reduced. The adsorbed ammonia is desorbed from the bed at the reduced pressure. The desorbed ammonia is discharged from the bed in flow direction opposite to the flow direction of the feed stream of the gaseous material for a second cycle period. During the second period, at least a portion of the unreacted gas is passed through the bed in a flow direction of the desorbed ammonia fraction. This latter mixture comprising a portion of the unreacted gases and the desorbed ammonia is discharged from the bed as a secondary effluent product. The cycle periods are adjusted for a time duration adapted to develop a concentration gradient of the ammonia fraction in said bed wherein the gradient has a lower concentration in a zone intermediate the ends of the bed. An oscillatory movement is imparted to these zones in the beds substantially within the limits of the zones in a direction and for a distance which corresponds respectively to the direction of flow through the beds during each cycle period and to the duration thereof.

When a reaction bed containing catalyst and adsorbent is used, it is desirable that the depressuring step be completed as rapidly as possible so as to prevent significant reaction reversal of the ammonia back to nitrogen and hydrogen caused by the lowering of the pressure while the catalyst is present. For this reason it is preferable that the bed be depressured to the desorption pressure in a time within the range of between 0.25 to 30 seconds, preferably 0.4 to 5 seconds and most preferably 0.5 to 1 second. It is possible to accomplish rapid depressuring in relatively small beds by using large ports and valves in the outlet ends of the beds. For example, a 0.5 inch orifice valve will be sufficient to depressure a 1 gallon size bed in the desired time range.

Sudden depressuring causes the product ammonia to evaporate rapidly from the adsorbent, adiabatically cooling itself and the particles in the beds. It is this sudden expansion which prevents the ammonia from reverting to hydrogen and nitrogen. Furthermore, during the initial portion of the depressuring, the depressure stream consists of a mixture of unreacted hydrogen and nitrogen along with some product ammonia. This stream consists mainly of the void gases. The later portion of the depressure gas and the subsequent seepage consists of a high purity ammonia.

It should be noted that the process of the present invention referring to FIGURE II has been described as utilizing a backwash of each absorbent zone with a portion of the primary effluent of the other zone after it has been depressured and prior to repressuring on the next cycle. It must be emphasized that such a backwash is needed in the case where the adsorbent zone contains an adsorbent which has a relatively low working capacity for ammonia. The working capacity being defined as the amount of material adsorbed at the high pressure minus the amount of material adsorbed at the low pressure over the course of a pressure cycle. In the case of a low capacity sieve, it is necessary to rid the adsorbent of as much residual adsorbed ammonia as possible by backwashing in order to make the output of each cycle sufficiently large. On the other hand, when the adsorbent chosen has a large working capacity for ammonia, it is not necessary or desirable to remove the residual ammonia by backwashing in order to obtain a reasonably large output per cycle of ammonia from the bed.

The adsorbent used in the present invention may be of any type as, for example, 4A, 5A, 13A molecular sieves, silica gel, activated alumina, ion exchange resins as, for example, Dow X, and other classes of known adsorbents. A desirable adsorbent for use in the manufacture of ammonia comprises 5A molecular sieves.

The pressures also may be varied appreciably. As pointed out heretofore, the present technique permits the use of lower pressures and temperatures than in processes which normally require relatively high pressures and temperatures. In general, the pressures can be at any level desired and the operation is one wherein there exists a ratio of absolute pressures in order to secure the pressure cycling technique. Thus, it is within the concept of the present invention to use relatively low pressure, as for example a delta pressure vacuum operation. It is also within the concept of the present invention, under certain conditions, to operate in the absence of a backwashing purge.

An operation in accordance with one adaptation of the present invention was carried out wherein a 30 cc. reactor was 60% filled with 5A molecular sieves and with 40% of reduced iron oxide catalysts. The adsorbent and the catalyst were uniformly distributed and mixed throughout. The results of these operations are illustrated in the following table.

*Percent feed conversion*

| Theoretical | No Adsorbent | With Adsorbent [1] |
|---|---|---|
| 28 | 25 | [2] 60 |

Conditions: 450° C., 100 Atm., 75% $H_2$—25% $N_2$ in feed.
Adsorbent: Reactor 60% filled with 5A molecular sieve.
[1] The reaction is quenched by submerging the reactor in $H_2O$ to prevent reaction reversal.
[2] Corresponds to 2.2 weight percent $NH_3$ on 5A sieve.

From the above, it is apparent that excellent results are secured when operating in accordance with the present process.

What is claimed is:

1. An improved process for the synthesis of ammonia from a gaseous mixture utilizing two catalyst beds each of which is characterized by having a one end and another end, said process comprising the steps of flowing a feed stream of a gaseous mixture of nitrogen and hydrogen from one end to the other end through a first bed of a catalyst at a preselected initial relatively high pressure and in a positive flow direction in an initial cycle, said catalyst being active for the fixation of nitrogen and hydrogen to produce ammonia, discharging said gaseous mixture stream from said first bed as a primary effluent containing ammonia; segregating a portion of said primary effluent as a product stream and withdrawing the same, passing the remainder of said primary effluent in reverse flow from the other end to the one end through a second bed of catalyst active for the fixation of nitrogen and hydrogen to produce ammonia at a relatively low pressure, which catalyst is relatively saturated with ammonia as compared to said first bed at start of said initial cycle, and withdrawing the same as a secondary effluent, whereby as said initial cycle continues, said first bed becomes relatively saturated with ammonia progressively from said one end toward said other end, and whereby said second bed becomes relatively freed from ammonia from said other end toward said one end; continuing said initial cycle for a time period less than that required to secure saturation of said first bed at said other end and that required to secure freedom from ammonia of said second bed at said one end; thereafter introducing said feed stream into said one end of said second bed in positive flow direction at said initial relatively high pressure; discharging said gaseous mixture stream from said other end of said second bed as a primary effluent containing ammonia; segregating a portion of said last named primary effluent as a product stream and withdrawing the same; passing the remainder of said last named primary effluent in reverse flow from said other end to said one end through said first bed of catalyst at said relatively low pressure, withdrawing the same as a secondary effluent, and thereafter cyclically continuing the operation, whereby the product ammonia produced about the catalyst and tending to smother its activity is agitated, thereby maintaining the catalytic activity at a peak.

2. Process as defined by claim 1 wherein said product stream of said primary effluent and said secondary effluent are passed to a second series of two adsorbent beds, each of which is characterized by having a one end and another end, the process in said second series comprising the steps of flowing said product stream and said secondary effluent from one end to the other end through a first bed of an adsorbent initially relatively free of ammonia at a preselected initial relatively high pressure and in a positive flow direction in an initial cycle, said adsorbent being preferentially selective for ammonia; discharging said gaseous mixture stream from said first bed as a primary effluent; segregating a portion of said primary effluent and withdrawing the same; passing the remainder of said primary effluent in reverse flow from the other end to the one end through a second bed of adsorbent at a relatively low pressure, which adsorbent is relatively saturated with ammonia as compared to said first bed at the start of said initial cycle, whereby as said initial cycle continues, said first bed becomes relatively saturated with ammonia progressively from said one end toward said other end, and whereby said second bed becomes relatively freed from ammonia from said other end toward said one end; continuing said initial cycle for a time period less than that required to secure saturation of said first bed at said other end and that required to secure freedom from ammonia of said second bed at said one end; thereafter introducing said product stream and said secondary effluent into said one end of said second bed in positive flow direction at said initial relatively high pressure; discharging said gaseous mixture stream from said other end of said second bed as a primary effluent; segregating a portion of said last named primary effluent and withdrawing the same; passing the remainder of said last named primary effluent in reverse flow from said other end to said one end through said first bed of adsorbent at said relatively low pressure, and thereafter cyclically continuing the operation.

3. Process as defined by claim 2 wherein said catalyst in said first series of beds comprises iron and wherein said adsorbent in said second series of beds comprises activated carbon.

4. Improved process for the manufacture of ammonia which comprises utilizing two beds, each bed of which comprises uniformly distributed therethrough a catalyst for the fixation of hydrogen and nitrogen to synthesize ammonia and an adsorbent for the ammonia, each bed of which is also characterized by having a one end and another end, said process comprises the steps of flowing a feed stream of gaseous mixture comprising nitrogen and hydrogen from one end to the other end through a first bed initially relatively free of said ammonia at a preselected initial relatively high pressure and in a positive flow direction in an initial cycle, discharging said gaseous mixture stream from said first bed as a primary effluent, segregating a portion of said primary effluent and passing the same in reverse flow from the other end to the one end through a second bed comprising a catalyst and adsorbent at a relatively low pressure, which adsorbent is relatively saturated with said ammonia as compared to said first bed at the start of said initial cycle, withdrawing the same as a secondary effluent, whereby as said initial cycle continues, said first bed becomes relatively saturated with said ammonia progressively from said one end toward said other end and whereby said second bed becomes relatively freed from said ammonia from said other end toward said one end continuing said initial cycle for a time period less than that required to secure saturation of said first bed at said other end and that required to secure freedom from said ammonia of said second bed at said one end; thereafter introducing said freed stream into said one end of said second bed in positive flow direction at said initial relatively high pressure; discharging said gaseous mixture stream from said other end of said second bed as a primary effluent; segregating a portion of said last named primary effluent and withdrawing the same; passing the remainder of said last named primary effluent in reverse flow from said other end to said one end through said first bed of adsorbent at said relatively low pressure and withdrawing the same as a secondary effluent, and thereafter cyclically continuing the operation.

5. The process of claim 4 wherein each of said beds in the proper order of sequence is depressured rapidly through one end of each of said beds from said initial relatively high pressure to said relatively low pressure, said depressuring taking place in about 0.25 to 30 seconds.

6. The process of claim 5 wherein said depressuring takes place in about 0.4 to 5 seconds.

7. The process of claim 5 wherein said depressuring takes place in about 0.5 to 1 second.

8. Process as defined by claim 4 wherein said catalyst comprises iron and wherein said adsorbent comprises activated carbon.

9. Process as defined by claim 8 wherein said streams passed in reverse flow through said zones comprising the secondary effluent is passed as a gaseous mixture stream into a second series of beds, consisting of an ammonia adsorbent, each bed of which is characterized by having a one end and another end, said process comprising the steps of flowing said secondary effluent from one end to the other end through a first bed of an adsorbent initially relatively free of ammonia at a preselected initial relatively high pressure and in a positive flow direction in an initial cycle, discharging said gaseous mixture stream from said first bed as a primary effluent; segregating a portion of said primary effluent and withdrawing the same; passing the remainder of said primary effluent in reverse flow from the other end to the one end through a second bed of adsorbent at a relatively low pressure, which adsorbent is relatively saturated with said ammonia as compared to said first bed at the start of said initial cycle, whereby as said initial cycle continues, said first bed becomes relatively saturated with said ammonia progressively from said one end toward said other end, and whereby said second bed becomes relatively freed from said ammonia from said other end toward said one end; continuing said initial cycle for a time period less than that required to secure saturation of said first bed at said other end and that required to secure freedom from said ammonia of said second bed at said one end; thereafter introducing said feed stream into said one end of said second bed in positive flow direction at said initial relatively high pressure; discharging said gaseous mixture stream from said other end of said second bed as a primary effluent; segregating a portion of said last named primary effluent and withdrawing the same; passing the remainder of said last named primary effluent in reverse flow from said other end to said one end through said first bed of adsorbent at said relatively low pressure, and thereafter cyclically continuing the operation.

References Cited by the Examiner

UNITED STATES PATENTS

| | | | |
|---|---|---|---|
| 1,319,663 | 10/1919 | Davis et al. | 23—196 |
| 1,667,322 | 4/1928 | Larson | 23—199 |
| 2,944,627 | 7/1960 | Skarstrom | 183—4.7 |

OSCAR R. VERTIZ, *Primary Examiner.*

BENJAMIN HENKIN, J. J. BROWN,
*Assistant Examiners.*